United States Patent Office 3,637,868
Patented Jan. 25, 1972

3,637,868
PROCESS FOR COUPLING IODOPERHALO COMPOUNDS
Henry R. Nychka, Dover, N.J., assignor to Allied Chemical Corporation, New York, N.Y.
No Drawing. Filed Apr. 21, 1969, Ser. No. 818,107
Int. Cl. C07c 43/00
U.S. Cl. 260—615 R          14 Claims

ABSTRACT OF THE DISCLOSURE

This invention relates to a method for coupling various iodoperhalo compounds particularly iodoperfluoroalkanes and iodoperfluoroalkyl ethers, by reaction in the presence of a metal fluoride selected from the group consisting of CsF, RbF, KF and $BaF_2$ at a temperature of at least about 275° C.

CROSS-REFERENCES TO RELATED APPLICATIONS (1) Co-pending application of Litt et al., entitled "Fluorinated Ethers" Ser. No. 492,276, filed Oct. 1, 1965, now Pat. No. 3,453,333.

(2) Co-pending application of Litt et al., entitled "Fluorinated Ethers," Ser. No. 513,574, filed Dec. 13, 1965, now Pat. No. 3,470,256.

(3) Co-pending application of Anello et al., entitled "Telomers and Preparation Thereof," Ser. No. 633,359, filed Apr. 25, 1967, now Pat. No. 3,514,487.

BACKGROUND OF THE INVENTION

Halogenated organic compounds are of great industrial importance. In particular, perfluorinated organic compounds are useful as dielectric coolants and heat transfer media because of a combination of favorable electrical and physical properties, chemical inertness and thermal stability. For high thermal stability it is important that the perfluorinated compounds be very pure. No hydrogen containing impurities can be tolerated as they are susceptible to thermal decomposition.

Large molecular size perhalo organic compounds may be prepared by coupling two iodoperhalo organic molecules together, eliminating iodine and forming a molecule larger in size than either of the original molecules. Iodoperhalo organic compounds are currently coupled by any of several different methods. One method involves coupling the iodoperhalo compounds in the presence of zinc in a suitable solvent. See U.S. Pat. No. 3,317,618. This coupling technique, however, gives a considerable amount of olefin and/or reduction produces which cause thermal stability problems. U.S. Pat. No. 3,046,304 discloses the application of ultra-violet radiation in the presence of mercury to cause coupling of iodoperhalo compounds. This method while giving high yields of coupled product is expensive and not easily suited to scaling up to industrial quantities.

Accordingly, it is an object of the present invention to provide a method for coupling various iodoperhalo organic compounds which avoids the shortcomings of the prior art methods.

It is another object of the present invention to provide a method for the coupling of various iodoperhalo compounds in the presence of certain hereinafter defined metal fluorides.

It is a more specific object of the present invention to provide a method for the coupling of iodoperfluoroalkanes and iodoperfluoroalkyl ethers in the presence of certain hereinafter defined metal fluorides wherein no reaction medium is required and whereby essentially no by-products are formed.

DESCRIPTION OF THE INVENTION

In accordance with this invention, it has been surprisingly found that various iodoperhalo organic compounds can be made to react in the presence of certain hereinafter defined metal fluorides without the use of a solvent and therefore the problems associated with a solvent are eliminated. For example:

(1) No hydrogen containing impurities are formed
(2) The product is easily isolated from the unreacted starting material.

The invention process entails the coupling of two iodoperhalo organic reactants of the formula

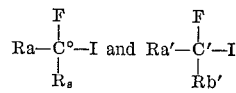

wherein $R_a$, $R_b$, $R_a'$ and $R_b'$ are independently fluorine or a perhalo organic radical of 1 to 24 carbon atoms, preferably 1 to 16 carbon atoms, selected from the group consisting of perhaloalkyl, perhalocycloalkyl, perfluoroaryl, perhaloalkyl substituted perfluoroaryl, perhaloalkylene substituted perfluoroaryl and perhaloalkoxy, with the total number of carbon atoms in each iodoperhalo organic reactant being no more than 37, preferably no more than 21; and wherein the halo portion can be fluorine, chlorine, bromine, iodine or mixtures thereof, with the provisos that both $R_a$ and $R_b$ are not fluorine, both $R_a'$ and $R_b'$ are not fluorine, and iodine atoms must be separated from each other and from C° and C' by at least one non-iodo containing carbon atom, i.e., iodines may not be attached to adjacent carbon atoms and no more than one iodine may be attached to any one carbon atom. The two iodoperhalo organic reactants may be the same or different.

In the above defined $R_a$, $R_b$, $R_a'$ and $R_b'$, the perhalocycloalkyl group may be unsubstituted or substituted with perhaloalkyl substituents, the perhaloalkoxy may be connected to C° or C' directly or through an intervening perhaloalkyl, and all carbon chains in the $R_a$, $R_b$, $R_a'$ and $R_b'$ groups may be straight chain or branched.

Preferably $R_a$, $R_b$, $R_a'$ and $R_b'$ are independently fluorine or a perhaloalkyl radical of 1 to 24 carbon atoms, and $R_a$ and $R_a'$ may additionally be independently selected from the group consisting of perhaloalkoxy and perhaloalkoxyalkyl radicals of 1 to 24 carbon atoms.

The most preferred iodoperhalo organic compounds are (1) iodoperfluoroalkanes, subject to the above provisos, wherein $R_a$ and $R_b$ are independently fluorine or a perfluoralkyl of 1 to 24 carbon atoms, preferably 1 to 16 carbon atoms; (2) diiodoperfluoroalkanes wherein $R_a$ is an iodoperfluoroalkyl or 1 to 24 carbon atoms, preferably 1 to 16 carbon atoms, and $R_b$ is fluorine or perfluoroalkyl of 1 to 24 carbon atoms, preferably 1 to 16 carbon atoms; and (3) iodoperfluoroalkyl ethers of the formula

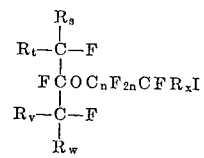

(II)

wherein $R_s$, $R_t$, $R_v$, $R_w$ and $R_x$ are each independently selected from the group consisting of fluorine and perfluoroalkyl of 1 to 3 carbon atoms, preferably $R_s$, $R_t$, $R_v$, $R_w$ and $R_x$ are each fluorine, and $n$ is such that the total number of carbon atoms in the iodoperfluoro ether is not more than 25, preferably not more than 17.

The coupled product has the general formula

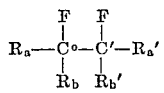

wherein $R_a$, $R_b$, $R_a'$ and $R_b'$ are as defined above and the total number of carbon atoms in the coupled product does not exceed 74, and preferably does not exceed 42.

In the invention process, the hereinabove defined iodoperhalo organic reactants are coupled by reacting them with a metal fluoride selected from the group consisting of CsF, RbF, KF and $BaF_2$, the preferred metal fluorides being CsF and RbF.

No reaction medium is required for the process, which takes place in either the vapor or the liquid phase depending upon the reaction temperature employed and the boiling point of the particular iodoperhalo compound being coupled. Reaction temperature is at least about 275° C. preferably from about 300° C. to about 450° C., and most preferably from about 325° C. to about 400° C. Reaction time is not critical to the invention process, however, to obtain optimum yields a reaction time of about at least 4 hours is preferred, most preferably about 8 hours to about 20 hours. The reaction may be run at atmospheric or at sub- or superatmospheric pressures.

The ratio of metal fluoride to iodoperhalo reactant is not critical as some coupling will always occur as long as there is some amount of metal fluoride present and the temperature of the reaction mixture is within the above stated range. However, to obtain optimum yields a stoichiometric amount of metal fluoride should be present in the reaction mixture, i.e., one mole of metal fluoride for every two moles of iodoperhalo reactant. Most preferred is a mole ratio of metal fluoride to iodoperhalo reactant of from about 0.5:1 to about 3:1.

The reaction product consists essentially of coupled product, unreacted starting material and a metal fluoride-iodide complex. The coupled product can readily be recovered by any of the conventional methods known to those skilled in the art. For example, because of the wide difference in their boiling points, the coupled product and the starting material can be readily separated by fractional distillation.

Illustrative of iodoperhalo organic compounds suitable for use as reactants in the invention process are the following:

$CF_3(CF_2)_{15}CF_2I$ $CF_3(CF_2CFCl)_{23}CF_2I$ $CF_3(CF_2)_4\overset{\underset{|}{CF_2CF_2Br}}{C}FCF_2I$ $CF_3CFI(CF_2)_4\overset{\underset{|}{CF_3}}{C}FI$

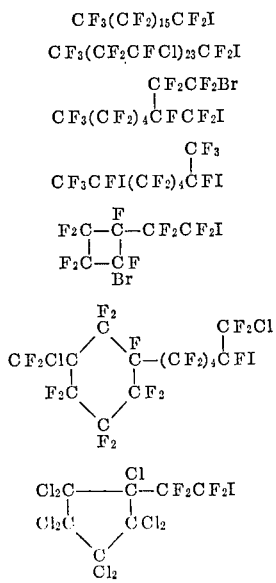

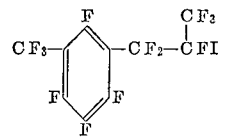

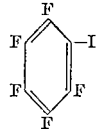

$CF_3$
$|$
$CF_3(CF_2)_9OCF_2CF_2I$ $CF_3(CF_2CFCl)_{20}OCF_2CF_2I$

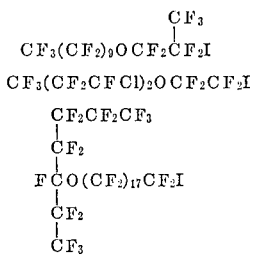

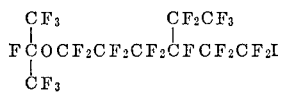

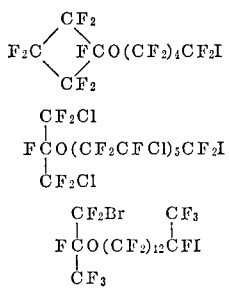

$CF_2Cl$
$|$
$FCO(CF_2CFCl)_5CF_2I$
$|$
$CF_2Cl$ $\quad CF_2Br \quad CF_3$
$\qquad | \qquad\quad |$
$\;FCO(CF_2)_{12}CFI$
$\quad |$
$\quad CF_3$ The iodoperfluoroalkyl ether reactants of Formula II are produced by the methods disclosed in co-pending applications Ser. Nos. 492,276; 513,574 and 633,359, mentioned supra. Iodoperfluoroalkyl ethers of Formula II in which $n=1$ are telogens which may be prepared by reacting an appropriate perfluoro ketone with an ionizable fluoride salt, e.g., KF, to form a fluorinated organic salt and then reacting the organic salt with iodine and an appropriate olefin, such as tetrafluoroethylene, in the presence of an inert organic solvent, to form the desired telogen. The reaction between the perfluorinated ketone with the ionizable fluoride salt proceeds readily at room temperature and is best carried out under anhydrous conditions in the presence of an inert organic solvent such as acetonitrile or dimethyl formamide. The reaction between the fluorinated organic salt with the olefin and iodine also proceeds readily at room temperature and may be conducted in the same solvent medium as the first mentioned reaction. These reactions are more fully described in copending applications Ser. Nos. 492,276 and 513,574 mentioned supra.

The longer chain iodoperfluoroalkyl ether reactants possessing an even number of carbon atoms linking the oxygen and iodine atoms, are telomers which may be prepared by telomerizing the telogens described above with a telomerizable unsaturated material comprising an olefin possessing only fluorine substituents.

The telogens may first be telomerized to a desired molecular weight with a first olefin and then the resulting telomer product may optionally be further telomerized to a higher molecular weight with an additional olefin or olefins.

The telomerization reaction is carried out under free radical conditions. The free radicals are preferably produced by thermal initiation of the reaction and this is accomplished simply by heating the reactants to an elevated temperature. The elevated temperature should normally be between about 100° C. and 350° C., preferably between about 150°–200° C. Alternatively, conventional free radical generating catalysts may be employed to initiate the reaction. Although the reaction may be conducted at atmospheric pressure, superatmospheric pressures, for example, up to about 20,000 p.s.i.g. may be used with pressures between about 1000 p.s.i.g. and about 10,000 p.s.i.g. being especially preferred. The chain length of the resulting product is influenced by the reaction period which may vary from about 10 minutes to about 2 weeks.

The ratio of telogen to olefin may vary from about 1:75 to as high as 200:1, the preferred ratio for batchwise operation being about 1:1 to 2:1 in the production of relatively low molecular weight telomers, i.e., telomers containing up to about 6 or 7 monomer units per telomer molecule. On the other hand, in a constant pressure reaction, i.e., where a constant pressure of olefin is maintained above the liquid phase comprising the telogen during the reaction, the molecular weight of telomer product may be controlled by varying the pressure of the olefin. In general, the higher the pressure of the olefin, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telomerization is described in more detail in co-pending application Ser. No. 633,359, mentioned supra.

The longer chain iodoperfluoro alkyl ethers reactants possessing an odd number of carbon atoms linking the oxygen and iodine atoms, are telomers which may be prepared by the following procedure. An iodoperfluoroalkyl ether telogen as defined by Formula II above, containing two carbon atoms linking the oxygen and iodine atoms is reacted with sulfur trioxide to form an acid halide. The reaction is carried out at temperatures between about 50–175° C. Preferably, an excess of $SO_3$ is used and sufficient pressure is employed to maintain the reactants in liquid phase. The acid halide is hydrolyzed to the acid by refluxing in water. The resulting acid has a single carbon atom linking the oxygen atom with the carboxy group. The acid can then be converted to the corresponding telogen iodide possessing a single carbon atom linking the oxygen and iodine atoms by the well-known Hunsdiecker reaction which involves reacting the acid with alkali-free silver oxide ($Ag_2O$) to form the silver salt followed by reaction of the silver salt with powdered iodine to form the iodide. This telogen iodide can then be telomerized with one or more olefins to produce telomer iodides having an odd number of carbon atoms linking the oxygen and iodine atoms. Illustrative procedures are shown as follows:

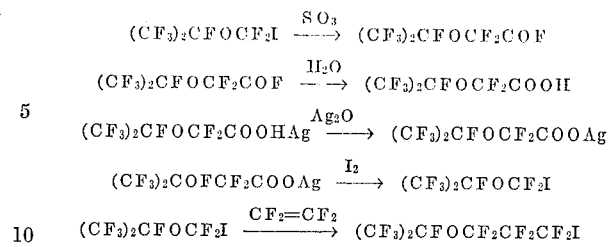

$$(CF_3)_2CFOCF_2I \xrightarrow{SO_3} (CF_3)_2CFOCF_2COF$$

$$(CF_3)_2CFOCF_2COF \xrightarrow{H_2O} (CF_3)_2CFOCF_2COOH$$

$$(CF_3)_2CFOCF_2COOHAg \xrightarrow{Ag_2O} (CF_3)_2CFOCF_2COOAg$$

$$(CF_3)_2COFCF_2COOAg \xrightarrow{I_2} (CF_3)_2CFOCF_2I$$

$$(CF_3)_2CFOCF_2I \xrightarrow{CF_2=CF_2} (CF_3)_2CFOCF_2CF_2CF_2I$$

The other classes of iodoperhalo compounds which are suitable for use as reactants in the process of this invention are all well known classes of compounds; many of which are commercially available, and all of which can be readily prepared by conventional methods known to those skilled in the art.

The compounds produced by the invention process possess excellent chemical and thermal stability. They are thus useful as inert reaction media for carrying out chemical reactions, as hydraulic fluids, as lubricants, and as heat transfer agents. They are especially useful as dielectric liquid and/or vapor phase coolants and heat transfer media for use in electrical and electronic equipment, and as chemically and thermally stable fluids useful in withstanding environmental conditions of extremes of both high and low temperatures.

The invention can be more fully understood by reference to the following examples.

EXAMPLE 1

A mixture of $(CF_3)_2CFOCF_2I$ (2.0 g., .005 mole), boiling point 87° C., and CsF (1.5 g., 0.01 mole) was sealed under vacuum in a heavy wall Pyrex tube and heated at 350° C. for 16 hours. The tube was then cooled, opened and analysis of the contents by vapor phase chromatography showed 87 wt. percent $(CF_3)_2CFO(CF_2)_4OCF(CF_3)_2$. The remainder was unreacted starting material. The presence of coupled product was confirmed by vapor phase chromatographic retention time and infrared spectrum.

EXAMPLE 2

The procedure of Example 1 was repeated but mole ratios, times and temperatures were varied for three different experiments. The conditions and results are as follows:

| $(CF_3)_2CFOCF_2CF_2I$, mole | CsF, moles | Mole ratio CsF:Iodo | Temp. °C. | Time, hours | Wt. percent coupled product |
|---|---|---|---|---|---|
| 0.005 | 0.010 | 2:1 | 350 | 8 | 42 |
| 0.005 | 0.005 | 1:1 | 350 | 17 | 44 |
| 0.005 | 0.0025 | 1:2 | 350 | 17 | 23 |

According to vapor phase chromatographic analysis, recovered material consisted of coupled product and unreacted starting material only.

EXAMPLE 3

Samples of $(CF_3)_2CFOCF_2CF_2I$ (48 g., 0.116 mole) and CsF (38 g., 0.25 mole) were combined in a 75 ml. stainless steel ampoule and heated with shaking at 350° C. for 16 hours. The volatile contents were then transferred by vacuum system into a liquid nitrogen trap. Vapor phase chromatographic analysis of 34.4 g. of the material collected showed it to contain 84.2% of coupled product and 15.8% of unreacted starting material. This represents an 87% conversion to coupled product and a 98% yield of coupled product.

EXAMPLE 4

This was a repeat of Example 3 except that the ampoule was placed in an oven and heated without shaking. The conversion to coupled product was 73% and the yield was 96%.

EXAMPLE 5

Following the procedure of Example 3

$(CF_3)_2CFOCF_2CF_2I$ (49.1 g., 0.12 mole) and RbF (25.4 g., 0.24 mole) were similarly heated with shaking in a 75 ml. stainless steel ampoule. Reaction time and temperature were the same. Conversion of starting material to coupled product was 82% and yield of coupled product was 88%.

EXAMPLE 6

A mixture of $(CF_3)_2CFO(CF_2)_4I$ (2.0 g., .004 mole), boiling point 130° C., and CsF (1.2 g., .008 mole) was reacted as described in Example 1. The recovered material was 96% pure and gave an infrared spectrum that was identical with that of an authentic sample of $(CF_3)_2CFO(CF_2)_8OCF(CF_3)_2$, boiling point 199° C.).

EXAMPLE 7

A repeat of Example 1 with $(CF_3)_2CFO(CF_2)_6I$ (boiling point 165° C.) gave a wax-like product having a melting point of 37° C. and an infrared spectrum similar to that of an authentic sample of $(CF_3)_2CFO(CF_2)_{12}OCF(CF_3)_2$ (melting point 41° C.).

EXAMPLE 8

A repeat of Example 1 with $(CF_3)_2CFO(CF_2)_8I$ (boiling point 199° C.) gave a wax-like product whose melting point of 89° C. and infrared spectrum agreed with that of an authentic sample of $(CF_3)_2CFO(CF_2)_{16}OCF(CF_3)_2$ (melting point 92° C.).

EXAMPLE 9

A repeat of Example 5 with $(CF_3)_2CFO(CF_2)_{10}I$ (boiling point 126°/25 mm.) gave a wax-like product whose melting point of 123° C. and infrared spectrum agreed with that of an authentic sample of $(CF_3)_2CFO(CF_2)_{20}OCF(CF_3)_2$ (melting point 126° C.).

EXAMPLE 10

A mixture of $(CF_3)_2CFOCF_2CFICF_3$ (1.8 g., .004 mole), boiling point 105° C. and CsF (1.2 g., .008 mole) was reacted as described in Example 1. The recovered material had a major component having an infrared spectrum similar to that of an authentic sample of $(CF_3)_2CFOCF_2CF(CF_3)CF(CF_3)CF_2OCF(CF_3)_2$ (boiling point 168° C.).

EXAMPLE 11

A mixture of $C_2F_5I$ (0.9 g., .004 mole), boiling point 13° C. and CsF (1.0 g., .007 mole) was reacted as described in Example 1. An infrared analysis of the gaseous sample showed the same characteristic absorption peaks as those reported in the literature for $n-C_4F_{10}$.

EXAMPLE 12

A mixture of $n-C_3F_7I$ (2.0 g., .007 mole), boiling point 41° C. and CsF (2.1 g., .014 mole) was treated as described in Example 1. The recovered material was 95% pure and gave an infrared spectrum having the same absorption peaks as those reported in the literature for $n-C_6F_{14}$.

EXAMPLE 13

Samples of $i-C_3F_7I$ (40.0 g., .135 mole), boiling point 40° C. and CsF (40.0 g., 0.26 mole) were combined in a 75 ml. ampoule which was heated in an oven (without shaking) for 14 hours at 350° C. After cooling, there was obtained 18.7 g. of the coupled product, perfluoro-2,3-dimethylbutane, in 96% chromatographic purity. This represented a 79% yield. A spinning band distillation of the product gave an overhead material of boiling point 56–60° C. (Literature value 60.0° C.) Fluorine NMR analysis of the distilled product confirmed the assigned structure.

EXAMPLE 14

A mixture of $n-C_7F_{15}I$ (2.0 g., .005 mole) boiling point 137° C., and CsF (1.2 g., .008 mole) was treated as described in Example 1. The recovered material was a wax-like product having a melting point of 99° C. This agreed with the reported literature value of 99–101° C. for the compound $n-C_{14}F_{30}$.

EXAMPLE 15

A mixture of $CF_2ICF_2CF_2I$ (5.0 g., .012 mole) boiling point 68°/98 mm. Hg, and CsF (1.92 g., .012 mole) were combined in a 20 ml. Pyrex tube and heated at 350° C. for 18 hours. After the reaction period, the tube was cooled to room temperature and 0.36 g. of volatile products were released from the tube. The solid remaining was washed consecutively with a dilute $Na_2SO_3$ solution and water and then dried. A white waxy solid product equal to 1.3 g. was obtained.

I claim:

1. A method of making a coupled product of the formula $$R_a-\underset{R_b}{\underset{|}{C^\circ}}-\underset{R_b'}{\underset{|}{C'}}-R_a'$$
$$\phantom{R_a-}\overset{|}{F}\phantom{-}\overset{|}{F}$$

wherein $R_a$, $R_b$, $R_a'$ and $R_b'$ are independently fluorine or a perhalo alkyl radical of 1 to 24 carbon atoms, and wherein $R_a$ and $R_a'$ may additionally be independently selected from the group consisting of perhaloalkoxy and perhaloalkoxyalkyl radicals of 1 to 24 carbon atoms, with the provisos that the total number of carbon atoms in said coupled product does not exceed 74, both $R_a$ and $R_b$ are not fluorine, both $R_a'$ and $R_b'$ are not fluorine, at least one of $R_a$ and $R_a'$ is a perhaloalkoxy or a perhaloalkoxyalkyl radical of 1 to 24 carbon atoms, and iodine atoms are separated from each other and from C° and C' by at least one non-iodo containing carbon atom, said method comprising coupling two iodoperhalo organic reactants of the formula $$R_a-\underset{R_b}{\underset{|}{C^\circ}}-I \text{ and } R_a'-\underset{R_b'}{\underset{|}{C'}}-I$$

by reacting them with a metal fluoride selected from the group consisting of CsF, RbF, KF and $BaF_2$ at a temperature of at least about 275° C.

2. The method of claim 1, wherein the metal fluoride is CsF or RbF.

3. The method of claim 2, wherein the reaction temperature is from about 300° C. to about 450°.

4. The method of claim 2, wherein the reaction temperature is from about 325° C. to about 400° C.

5. The method of claim 1, wherein the iodoperhalo organic reactants are iodoperfluoroalkyl ethers of the formula $$\underset{R_v-\underset{R_w}{\underset{|}{C}}-F}{\overset{R_t-\overset{R_s}{\overset{|}{C}}-F}{FCOC_nF_{2n}CFR_xI}}$$

wherein $R_s$, $R_t$, $R_v$, $R_w$ and $R_x$ are each independently fluorine or perfluoroalkyl of 1 to 3 carbon atoms and $n$ is such that the total number of carbon atoms in said iodoperfluoroalkyl ether does not exceed 37.

6. The method of claim 5, wherein $n$ is such that the total number of carbon atoms in said iodoperfluoroalkyl ether does not exceed 21.

7. The method of claim 6, wherein the metal fluoride is CsF or RbF and the reaction temperature is from about 300° C. to about 450° C.

8. The method of claim 7, wherein the reaction temperature is from about 325° C. to about 400° C.

9. The method of claim 8, wherein $R_s$, $R_t$, $R_v$, $R_w$ and $R_x$ are each fluorine and $n$ is such that the total number of carbon atoms in said iodoperfluoroalkyl ether does not exceed 13.

10. The method of claim 9, wherein the iodoperfluoroalkyl ether is $(CF_3)_2CFOCF_2CF_2I$.

11. The method of claim 9, wherein the iodoperfluoroalkyl ether is $(CF_3)_2CFO(CF_2)_4I$.

12. The method of claim 9 wherein the iodoperfluoroalkyl ether is $(CF_3)_2CFO(CF_2)_6I$.

13. The method of claim 9, wherein the iodoperfluoroalkyl ether is $(CF_3)_2CFO(CF_2)_{10}I$.

14. The method of claim 9, wherein the iodoperfluoroalkyl ether is $(CF_3)_2CFOCF_2CFICF_3$.

References Cited

UNITED STATES PATENTS

| | | | |
|---|---|---|---|
| 2,894,971 | 7/1959 | O'Rear et al. | 210—653 X |
| 3,317,618 | 5/1967 | Haszeldine | 260—653 |
| 3,435,078 | 3/1967 | Nychka et al. | 260—615 |

HOWARD T. MARS, Primary Examiner

U.S. Cl. X.R.

252—77; 260— 648 F, 649 F, 653